United States Patent
Brewer (10) Patent No.: US 9,473,992 B1
(45) Date of Patent: *Oct. 18, 2016

(54) SBC-LOCALIZED HANDOFF (71) Applicant: PEERLESS NETWORK, INC., Chicago, IL (US)

(72) Inventor: James E. Brewer, Chicago, IL (US)

(73) Assignee: PEERLESS NETWORK, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/994,922

(22) Filed: Jan. 13, 2016

Related U.S. Application Data (63) Continuation of application No. 14/792,049, filed on Jul. 6, 2015, now Pat. No. 9,264,944.

(51) Int. Cl.
*H04W 36/00* (2009.01)
*H04L 29/06* (2006.01)
*H04L 12/721* (2013.01)
*H04L 12/741* (2013.01)

(52) U.S. Cl.
CPC .......... *H04W 36/0055* (2013.01); *H04L 45/44* (2013.01); *H04L 45/74* (2013.01); *H04L 65/608* (2013.01)

(58) Field of Classification Search
CPC . H04W 8/26; H04W 36/00; H04W 36/0011; H04W 36/0016; H04W 36/0027; H04W 40/36; H04W 40/246; H04W 80/04; H04W 36/0055; H04L 12/28; H04L 29/125; H04L 29/12094; H04L 45/00; H04L 45/74; H04L 61/1529; H04L 61/2007; H04L 61/2517; H04L 61/2564; H04L 65/1006; H04L 67/14; H04L 29/06176; H04L 29/06319; H04L 29/06326; H04L 45/22; H04L 45/3065; H04L 47/00; H04L 47/10; H04L 47/2416; H04L 65/104; H04L 65/1033; H04L 65/1069; H04L 65/1083; H04L 65/1093; H04L 67/18; H04L 67/141; H04L 67/1021; H04L 45/44; H04L 65/608
USPC ......... 370/310-350, 400-401; 455/431-464; 709/223-229, 238-250
See application file for complete search history.

(56) References Cited

U.S. PATENT DOCUMENTS 7,283,822 B2 10/2007 Gallagher et al.
7,532,875 B1 5/2009 Parks et al.
(Continued)

FOREIGN PATENT DOCUMENTS

WO    WO-02096026      11/2002
WO    WO-2007089681 A2   8/2007
(Continued)

*Primary Examiner* — Tri H Phan
(74) *Attorney, Agent, or Firm* — Marshall, Gerstein & Borun LLP; Randall G. Rueth (57) ABSTRACT

Systems and methods are provided to facilitate the performance of a Session Border Controller (SBC)-localized handoff. As part of the SBC-localized handoff, a communication device may transmit packets within a data call to an SBC via a first IP address. Subsequently, the communication device may be assigned a second IP address. The communication device may then transmit further packets to the SBC via the second IP address. In response, the SBC may route all traffic within the data call direct to the communication device via the second IP address, regardless of whether the traffic indicates that the traffic should be delivered to the first IP address.

20 Claims, 5 Drawing Sheets

(56) References Cited

U.S. PATENT DOCUMENTS

| | | | |
|---|---|---|---|
| 7,565,145 B2 | 7/2009 | Gallagher et al. | |
| 7,620,391 B2 | 11/2009 | Itzkovitz et al. | |
| 7,623,486 B2 | 11/2009 | Caldwell et al. | |
| 7,664,495 B1 | 2/2010 | Bonner et al. | |
| 7,742,774 B2 | 6/2010 | Oh et al. | |
| 7,742,783 B2 | 6/2010 | Duarte | |
| 7,778,663 B2 | 8/2010 | Bong Doo | |
| 7,856,226 B2 | 12/2010 | Wong et al. | |
| 7,881,976 B2 | 2/2011 | Dayton et al. | |
| 7,885,654 B2 | 2/2011 | Fadell | |
| 7,885,661 B2 | 2/2011 | Cai | |
| 7,962,152 B2 | 6/2011 | Buerger et al. | |
| 7,970,419 B2 | 6/2011 | Oh et al. | |
| 8,059,097 B2 | 11/2011 | Duarte et al. | |
| 8,060,836 B2 | 11/2011 | Duarte | |
| 8,090,341 B2 | 1/2012 | Mitchell | |
| 8,184,575 B2 | 5/2012 | Miyagi et al. | |
| 8,233,400 B2 * | 7/2012 | Sardesai | H04L 45/00 370/248 |
| 8,265,243 B2 | 9/2012 | Alexander et al. | |
| 8,265,324 B2 | 9/2012 | Duarte et al. | |
| 8,391,834 B2 | 3/2013 | Raleigh | |
| 8,526,591 B2 | 9/2013 | Morken et al. | |
| 8,630,630 B2 | 1/2014 | Raleigh | |
| 8,634,531 B2 | 1/2014 | Morken et al. | |
| 8,635,335 B2 | 1/2014 | Raleigh et al. | |
| 8,649,799 B2 | 2/2014 | Noldus et al. | |
| 8,670,771 B2 | 3/2014 | Brownworth et al. | |
| 8,675,476 B2 | 3/2014 | Brownworth et al. | |
| 8,718,682 B2 | 5/2014 | Brownworth | |
| 8,730,920 B2 | 5/2014 | Brownworth et al. | |
| 8,750,250 B2 | 6/2014 | Milam et al. | |
| 8,761,778 B2 | 6/2014 | Mulcahy et al. | |
| 8,787,919 B1 | 7/2014 | Mulcahy et al. | |
| 8,797,267 B2 | 8/2014 | Duarte et al. | |
| 8,825,876 B2 | 9/2014 | Krishnaswamy et al. | |
| 8,825,881 B2 | 9/2014 | Mulcahy et al. | |
| 8,862,164 B2 * | 10/2014 | Chaturvedi | H04W 76/04 370/331 |
| 8,879,507 B2 | 11/2014 | Surface et al. | |
| 8,897,265 B2 | 11/2014 | Kashimba et al. | |
| 8,948,133 B2 | 2/2015 | Surface et al. | |
| 8,948,134 B2 | 2/2015 | Surface et al. | |
| 8,971,205 B2 | 3/2015 | Brownworth et al. | |
| 9,014,038 B2 | 4/2015 | Brownworth et al. | |
| 9,014,147 B1 | 4/2015 | White et al. | |
| 9,031,562 B2 | 5/2015 | Brownworth et al. | |
| 9,131,422 B2 * | 9/2015 | Surface | H04W 36/0083 |
| 9,264,944 B1 * | 2/2016 | Brewer | H04W 36/0016 |
| 2004/0185827 A1 | 9/2004 | Parks | |
| 2006/0015467 A1 | 1/2006 | Morken et al. | |
| 2007/0197228 A1 * | 8/2007 | McGary | H04M 15/00 455/445 |
| 2007/0268908 A1 | 11/2007 | Linkola et al. | |
| 2008/0057916 A1 | 3/2008 | Gamm et al. | |
| 2008/0064388 A1 | 3/2008 | Duarte et al. | |
| 2008/0085698 A1 | 4/2008 | Gamm | |
| 2008/0185772 A1 | 8/2008 | Duarte et al. | |
| 2008/0242343 A1 | 10/2008 | Koh et al. | |
| 2008/0242362 A1 | 10/2008 | Duarte | |
| 2008/0261569 A1 | 10/2008 | Britt et al. | |
| 2008/0304631 A1 | 12/2008 | Vilis et al. | |
| 2009/0088150 A1 | 4/2009 | Chaturvedi et al. | |
| 2009/0103687 A1 | 4/2009 | Peters | |
| 2009/0137227 A1 | 5/2009 | Bencheikh | |
| 2009/0138439 A1 | 5/2009 | Yeung et al. | |
| 2009/0186598 A1 | 7/2009 | Cipoletti et al. | |
| 2009/0186599 A1 | 7/2009 | Cipoletti et al. | |
| 2009/0279537 A1 * | 11/2009 | Strickland | H04L 29/125 370/352 |
| 2009/0287415 A1 | 11/2009 | Buerger et al. | |
| 2009/0290688 A1 | 11/2009 | Peters et al. | |
| 2010/0166154 A1 | 7/2010 | Peters | |
| 2010/0261448 A1 | 10/2010 | Peters | |
| 2011/0058544 A1 * | 3/2011 | Sardesai | H04L 45/00 370/352 |
| 2011/0096788 A1 * | 4/2011 | Ballard | H04L 29/12066 370/401 |
| 2011/0134907 A1 * | 6/2011 | Parolkar | H04L 45/04 370/352 |
| 2011/0230188 A1 * | 9/2011 | Gemski | H04W 60/00 455/435.1 |
| 2012/0120852 A1 | 5/2012 | Morken et al. | |
| 2013/0155889 A1 | 6/2013 | Brownworth et al. | |
| 2013/0157663 A1 | 6/2013 | Brownworth et al. | |
| 2013/0170045 A1 | 7/2013 | Hsu | |
| 2013/0303114 A1 * | 11/2013 | Ahmad | H04W 4/26 455/406 |
| 2013/0308601 A1 | 11/2013 | Brownworth et al. | |
| 2013/0311545 A1 | 11/2013 | Wright et al. | |
| 2013/0337802 A1 | 12/2013 | Morken et al. | |
| 2014/0029578 A1 | 1/2014 | Milam et al. | |
| 2014/0031003 A1 | 1/2014 | Shugart et al. | |
| 2014/0044125 A1 | 2/2014 | Rathnam et al. | |
| 2014/0105179 A1 | 4/2014 | Kashimba et al. | |
| 2014/0110777 A1 | 4/2014 | Peng et al. | |
| 2014/0113606 A1 | 4/2014 | Morken et al. | |
| 2014/0171084 A1 | 6/2014 | Chandler et al. | |
| 2014/0226537 A1 | 8/2014 | Kashimba et al. | |
| 2014/0269611 A1 | 9/2014 | Ionescu et al. | |
| 2015/0110081 A1 | 4/2015 | White et al. | |
| 2015/0124781 A1 | 5/2015 | Surface et al. | |

FOREIGN PATENT DOCUMENTS

| | | |
|---|---|---|
| WO | WO-2011115543 A1 | 9/2011 |
| WO | WO-2011149533 A1 | 12/2011 |
| WO | WO-2013170045 A2 | 11/2013 |
| WO | WO-2014110777 A1 | 7/2014 |

* cited by examiner

SBC-LOCALIZED HANDOFF

CROSS-REFERENCE TO RELATED APPLICATIONS

This application is a continuation of U.S. patent application Ser. No. 14/792,049, filed Jul. 6, 2015 and entitled "SBC-LOCALIZED HANDOFF," the entire disclosure of which is hereby expressly incorporated herein by reference.

TECHNICAL FIELD

The following disclosure relates to systems and methods for performing a session border controller-localized handoff; and more particularly, for performing the session border controller-localized handoff without initiation from call control network elements.

BACKGROUND

In many data networks, a call between two parties (e.g., a data call) must traverse both local and private networks. For example, a device registered on a Wi-Fi network may attempt to place a Voice Over Internet Protocol (VOIP) call to a device registered on a data network operated by a wireless provider (e.g., Verizon, AT&T, and the like). However, typically the Wi-Fi network and the data network are not directly connected. Instead, the VOIP call usually traverses a packet-switched network disposed between the Wi-Fi network and the data network. For example, the VOIP call may traverse at least one of the Internet, a long-distance router, an IP router, a public or private network backbone, and/or other network entities for connecting disparate wireless networks.

In order to control access to these intermediate packet-switched networks, most network operators deploy a plurality of Session Border Controller (SBCs). The SBCs may ensure that a party attempting to establish a call through the packet-switched network is authorized to access the network. Additionally, the SBCs may facilitate the establishment, management, and/or monitoring of calls as they enter/exit the packet-switched network.

A SBC may also ensure proper routing of packet data addressed to a particular device. To this end, when a device registers on a local network, the local network assigns the device an IP address. The SBC may then associate each call with the IP addresses assigned to each device participating in the call, as well as with a port number and/or a call ID identifying the corresponding call. During a conventional VOIP call, the packet-switched network typically determines the IP address and port number to which packet data should be addressed. As packet data leaves the packet-switched network, the SBC routes the packet data to this determined IP address and port number. Said another way, a conventional SBC acts as a pass-through entity. However, a device on an active call VOIP call may connect to a different local network. As a result, the new local network may assign the device a new IP address.

SUMMARY OF THE DISCLOSURE

In an embodiment, a method may include (1) associating, at a packet network interface, a first communication device, a particular port of the SBC, and a first IP address via which the first communication device is accessible; (2) maintaining, by the packet network interface, a communications session between the first communication device and a second communication device; and (3) during the maintained communications session (i) receiving, at the particular port of the packet network interface, a first packet from the first communication device, the first packet including first content that is to be delivered to the second communication device, and the first packet indicating that the first communication device is accessible via a second IP address; (ii) subsequent to receiving the indication that the first communication device is accessible via the second IP address, receiving, at the SBC from the second communication device, a second packet indicating the first IP address and including second content that is to be delivered to the first communication device; and (iii) routing, by the packet network interface, the content of the second packet to the first communication device by using the second IP address.

In an embodiment, a system may include (i) a plurality of transceivers adapted to send and receive data corresponding to a data call; (ii) a memory adapted to store non-transitory computer executable instructions; and (iii) one or more processors adapted to interface with the plurality of transceivers. The one or more processors may be configured to execute the non-transitory computer executable instructions to cause the system to (1) create a local call record corresponding to the data call and indicating a first address via which a communication device servicing the data call is accessible; (2) while the local call record indicates that the communication device is accessible via the first address, receive, at the plurality of transceivers, first traffic of the data call, the first traffic indicating a second address via which the communication device is accessible and including first data payload originated by the communication device; (3) upon reception of the first traffic indicating the second address, update the local call record to indicate that the communication device is accessible via the second address and not via the first address; (4) route the first data payload of the first traffic to a recipient party of the data call; (5) subsequent to updating the local call record, receive, at the plurality of transceivers, second traffic of the data call, the second traffic indicating the first address of the communication device and including second data payload to be delivered to the communication device; and (6) route the second data payload of the second traffic to the communication device using the second address.

In an embodiment, a method may include (1) receiving, at a Session Border Controller (SBC), a request to establish a communication session between a first communication device and a second communication device, the first communication device corresponding to a first IP address; (2) assigning, by the SBC, a bearer path port of the SBC to the communication session; (3) routing, via the SBC and by using the bearer path port, one or more data packets of the communication session to the first communication device using the first IP address; (4) receiving, at the SBC via the bearer path port, a data packet of the communication session that is to be delivered to the second communication device, the data packet including an indication that the first communication device corresponds to a second IP address; and (5) subsequent to receiving the data packet that is to be delivered to the second communication device, routing, via the SBC and by using the bearer path port, one or more further data packets of the communication session to the first communication device using the second IP address.

DETAILED DESCRIPTION

It should be understood that, unless a term is expressly defined in this patent using the sentence "As used herein, the term '_' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112(f).

Generally, communication devices (e.g., mobile phones, tablets, laptops, smart watches, and/or the like) are capable of connecting to a plurality of different wireless networks. For example, phones are commonly capable of communicating data over Wi-Fi, 4G, and/or 3G networks. When a communication device registers on each of these wireless networks, the network assigns to the communication device an internet protocol (IP) address and/or other similar type of address. It is not uncommon for a communication device to be concurrently registered on multiple different wireless networks. However, typically, a communication device may only be configured to use a preferred data network to participate in active data calls and/or communication sessions. The preferred communication network may be determined based on network availability, carrier preferences, and/or user preferences. As an example, to reduce network congestion, many mobile carriers require that communication devices prefer connecting to a Wi-Fi network over a 4G network.

In some situations, the preferred wireless network of a communication device may change based on network conditions. For example, if a user of a communication device is driving in a vehicle, the user may drive outside of the mobile carrier's 4G network, causing the communication device to prefer the mobile carrier's 3G network. In another example, a user of a communication device may leave his or her house, causing the preferred network of the communication device to change from the user's home Wi-Fi network to a mobile carrier's 4G network. In these examples, since the communication device's preferred network has changed, the IP address at which the communication device is accessible also has changed. Accordingly, if the user's communication device is engaged in an active data call while changing networks, a packet-switched network on which the call is routed through must update its call records to ensure that data is routed to the new IP address at which the communication device is now accessible.

Conventionally, this hand-off process involves the communication device executing a scanning algorithm to determine the relative signal quality between the currently preferred network and one or more other networks on which the communication device is able to register. In an exemplary scanning algorithm, if the signal strength of the preferred network is below a threshold value, the communication device attempts to connect to a different communication network with the strongest signal strength above a second threshold value. If the scanning algorithm determines that the communication device should transition to the other network, the communication device initiates a mobile-initiated handoff, e.g., by sending a hand-off request message. The mobile-initiated handoff causes the communication device to register on the other network while transmitting messaging that causes the packet-switched network to update its call records to reflect the IP address of the other network via which the communication device is now accessible.

However, this mobile-initiated handoff technique suffers a drawback in that the scanning algorithm solution requires the constant processing of network conditions by the communication device. This may result in the communication device dedicating more memory to call processing and experiencing a lower battery life.

Instead, by utilizing one or more of the novel and inventive techniques, methods, and/or systems described herein, a packet-switched network may enable communication devices to free up memory and/or processor resources by utilizing intelligent Session Border Controllers that are capable of autonomously handling handoffs of communication devices between networks. For example, an intelligent SBC may detect that a communication device is transmitting packet data from a new IP address within a previously established data call, e.g., within an established session. As a result, the intelligent SBC may route further or subsequent packet data within the data call that is addressed to the communication device to the new IP address. As a result, the communication device may not be required to initiate and/or transmit any handoff messaging, thereby eliminating the need of the communication device to execute the aforementioned scanning algorithms. The communication device may simply begin transmitting data on the new network and let the intelligent SBC handle the routing of packet data to the new network within the data call.

As will be described in greater detail below, this handoff is "localized" to the intelligent SBC since it occurs without updating a call record and/or routing information maintained by a packet-switched network, and/or without call control network elements initiating the handoff. Accordingly, such a handoff is generally referred to herein as an "SBC-localized handoff." An SBC-localized handoff may also be interchangeably referred to herein as an SBC-controlled handoff, an SBC-initiated handoff, and/or other similar terms. Further, although the techniques, methods, and systems described herein generally refer to SBC-localized handoff functionality as being performed by an SBC, other intermediate network components that perform a similar role in different network configurations may be configured to execute similar localized hand-off functionality. For example, some networks may use an IP router/firewall combination to perform the same functions that an SBC typically performs, and the IP router/firewall may be configured to execute localized hand-off functionality in a manner similar to that of the intelligent SBC. SBCs, IP routers, IP router/firewall combinations, and other types of intermediate networking components are more generally referred herein as "packet network interfaces." Accordingly, any functionality described as being performed by an SBC envisions the performance by any alternate packet network interface entity.

It should be appreciated that, in an embodiment, an SBC-localized handoff may only be performed for inter-network handoffs; whereas intra-network handoffs may function in the traditional, conventional manner. For example, a communication device on a mobile carrier's 4G network may be transported to a new location that causes the communication device to handoff to another 4G base station of the mobile carrier. Since both of the base stations are operated within the same wireless network, the communication device is not assigned a new IP address. Accordingly, in this example, there is no need to perform the SBC-localized handoff functionality described herein. On the other hand, when communication device is transported to a location causing it switch from the mobile carrier's 4G network to the mobile network of a roaming partner, the communication device may be accessed using a different IP address provided by the mobile network of the roaming partner, thereby necessitating the performance of the SBC-localized handoff.

Figure 1:
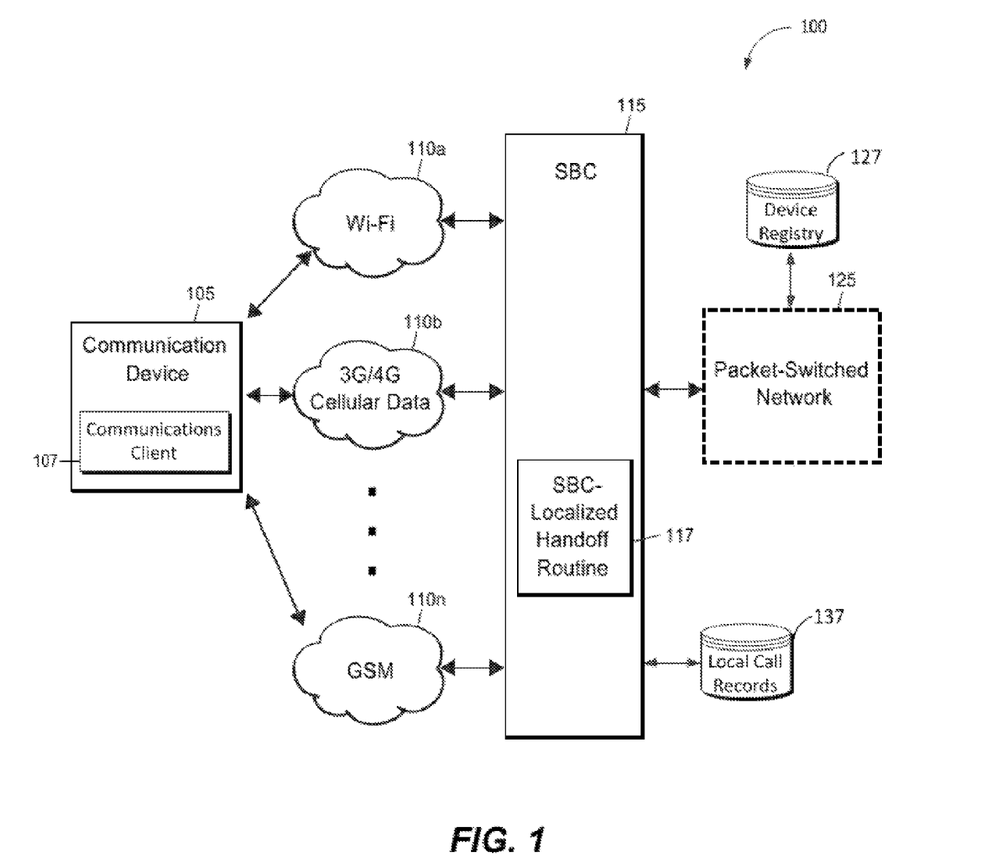
FIG. 1 depicts an embodiment of a communication system having a Session Border Controller that is configured to perform SBC-localized handoffs.

FIG. 1 illustrates a block diagram of an embodiment of a communication system 100 that supports the aforementioned embodiment of an SBC-localized handoff, as well as other embodiments of SBC-localized handoffs. The system 100 may include a communication device 105. The communication device 105 may be any electronic device capable of establishing a digital communications session with another communications device. For example, the communication device 105 may be any of a smart phone, a tablet, a laptop computer, a smart watch, smart glasses, and/or the like. Additionally, the communication device 105 may include a communications client 107 that enables the communication device 105 to transmit and receive packet data over a packet-switched network 125. The communications client 107 may be particularly configured to route packet data to an intelligent SBC 115 corresponding to a packet-switched network 125, and to receive packet data from the intelligent SBC 115.

According to certain aspects, the communication device 105 may be capable of accessing and communicating across a plurality of local networks 110a-110n. That is the communication device 105 may be configured to access one or more last-mile networks 110a-110n. Although in FIG. 1 the system 100 depicts the local network 110a as a Wi-Fi network, the local network 110b as a 3G/4G cellular data network and the local network 110n as a GSM network, it should be appreciated that the plurality of local networks 110a-110n may include any type of wireless communications network, including GSM, CDMA, TDMA, WCDMA, LTE, EDGE, OFDM, GPRS, EV-DO, UWB, WiMAX, Wi-Fi, Bluetooth, and/or the like. It should be appreciated that some of the plurality of local networks 110a-110n may utilize the same technology. For example, one of the plurality of local networks 110a-110n may comprise a home Wi-Fi network and another of the plurality of local networks 110a-110n may comprise a free public Wi-Fi network.

It will be understood that, in some cases, one or more of the plurality of local networks 110a-110n may comprise respective subnetworks and/or other similar configurations that divide each of the one or more local networks into smaller networks. In such subdivided local networks, the communication device 105 may be assigned an IP address using a subnet mask generated at a router (which, in turn, is associated with its own IP address). The SBC 115 typically may not receive indications of these subnet IP addresses. Accordingly, when the SBC 115 routes traffic that is to be delivered to the communication device 105 while it is registered on these types of subdivided wireless networks, the SBC 115 may route the traffic that is intended to be delivered to the communication device to the router, which subsequently routes or forwards the traffic to the communication device 105. Therefore, as generally used herein, the phrase "accessible at" or "accessible via" with reference to an IP address of the communication device 105 (or any other communication device) may be utilized, in some embodiments, with respect to both an IP address assigned by a subdivided one of the plurality of local networks 110a-110n to the communication device 105 and/or an IP address of a router (or similar networking component) that implements the subnetwork via which the communication device 105 is accessible.

The user of the communication device 105 may attempt to establish a data call and/or a communication session with a user of another communications device (which is generally referred to herein as a "terminating party" and is not shown in FIG. 1). Conversely, the terminating party may attempt to establish a data call and/or communication session with the communication device 105. The data call may comprise a communications session, such as a Voice over IP (VoIP) call, a video conferencing call, and/or other similar types of communications sessions. Referring to the example scenario in which the communication device 105 originates the data call, as part of the call establishment process, the communication device 105 may assign the data call and/or the communication session a call ID (such as a Session Initiation Protocol Call ID) and/or a session ID (such as a Session Description Protocol Session ID), respectively. The communication device 105 may then transmit, via one of the plurality of local networks 110a-110n, an origination request to the terminating party. In particular, the origination request may be addressed to an intermediate IP address associated with or indicative of the SBC 115. Similarly, once the data call with the terminating party has been established, the communication device 105 may transmit traffic (i.e., a series of data packets and/or packet data within a data call) to the terminating party via the SBC 115. The data packets within the traffic typically include a header describing parameters that facilitate the data call (including, e.g., the IP address of the SBC 115 and/or an identification of a port at the SBC 115 that has been assigned to the data call), and a payload that indicates or includes the content of the desired communication. Although the system 100 depicts only one communication device 105, it should be appreciated that any number of communication devices 105 may concurrently transmit traffic to a plurality of terminating parties via the SBC 115 and/or the packet-switched network 125.

Generally, the SBC 115 may be considered to be a gatekeeper of the packet-switched network 125. In this sense, the SBC 115 may be responsible for ensuring that only authorized traffic traverses the packet-switched network 125. To this end, the SBC 115 may implement filtering techniques well-known in the art to ensure that unauthorized traffic is not permitted onto the packet-switched network 125. If traffic is authorized to traverse the packet switched network 125, the SBC 115 may establish a bearer path across the packet-switched network 125 connecting the SBC 115 with another SBC associated with the terminating party (not shown in FIG. 1). As part of the establishment process, the SBC 115 may assign, to the data call, a port on the SBC 115 over which traffic associated with the data call is to traverse. Additionally, the SBC 115 may create a local SBC call record 137 associated with the data call. The SBC call record 137 may maintain information associated with the data call that is only accessible by the SBC 115. The SBC call record 137 may indicate and/or associate data call information such as, inter alia, the assigned port number, the call ID and/or session ID, an endpoint IP address via which the communication device 105 is accessible, one or more IP addresses associated with the terminating party and/or a network entity that routes traffic to the terminating party, an identifier of the communication device 105, and/or other similar type of data related to the data call.

Additionally, the SBC 115 may be responsible for routing traffic received from the packet-switched network 125 to the communication device 105. More particularly, the SBC 115 may ensure that traffic intended to reach the communication device 105 is routed to the communication device 105 over the appropriate local network of the plurality of local networks 110a-110n. To this end, the SBC 115 may monitor all traffic associated with data calls facilitated by the SBC 115, including the data call between the communication device 105 and the terminating party. When the SBC 115 receives a data packet from the packet-switched network 125 addressed to the communication device 105, the SBC 115 may obtain an identifier indicated by the data packet that identifies the data call and/or the communication session. The SBC 115 may utilize this identifier to query the corresponding SBC call record to determine the current endpoint address at which the communication device 105 is accessible.

It should be appreciated that, separate from the SBC call record, the packet-switched network 125 may maintain and store a database 127 of all devices registered on the packet-switched network 125. In some aspects, the information in both the SBC call record 137 at the SBC 115 and the device database 127 at the packet-switched network 125 may overlap. For instance, both may store information indicating an IP address and port at which the communication device 105 is accessible. As will be made clearer below, despite these databases storing data representative of the same condition, this information may be inconsistent between the databases.

In some embodiments, when the SBC 115 receives traffic from the communication device 105, the SBC 115 may route the traffic onto the packet-switched network 125. To this end, the SBC 115 may utilize a SBC-localized handoff routine 117 to ensure that traffic received from the communication device 105 is still routed onto packet-switched network 125 even as the communication device 105 moves between the plurality of local networks 110a-110n. In an example, whenever the communication device 105 transmits traffic to the terminating party, the traffic may include an indication of the IP address via which the communication device 105 is currently accessible, as well as an indication of the port number of the SBC 115 that has been assigned to the data call. To indicate the port number, in an embodiment, the communication device 105 may include the indication of the port number as part of the IP address corresponding to the SBC 115, for example, by appending a colon and the port number (e.g., 134.10.1.1:7021). Typically, this type of identifying information (e.g., the IP address via which the communication device 105 is currently accessible, the port number of the SBC 115, and/or other identifying information) may be included in the header of each data packet comprising the data call.

Accordingly, when the SBC 115 receives the traffic from the communication device 105, the SBC-localized handoff routine 117 may extract and/or obtain the indicated port number. The SBC-localized handoff routine 117 may then query the SBC call record to access information relating to the data call hosted on the extracted, indicated port of the SBC 115. Subsequently, the SBC-localized handoff routine 117 may compare the current IP address at which the communication device 105 is accessible as indicated by the received traffic (e.g., as contained within the header of the received traffic) with the IP address that is stored in the SBC call record 137. If the two IP addresses do not match, then the SBC-localized handoff routine 117 may then update the IP address stored in the SBC call record 137 to indicate that the communication device 105 is currently accessible at the new IP address indicated in the header of the received traffic. As a result, when the SBC 115 queries the SBC call record 137 in response to receiving subsequent traffic via the packet-switched network 125, the SBC 115 may determine that the traffic should be addressed to the updated IP address, and may deliver the subsequent traffic to the communication device 105 using the updated IP address stored in the SBC call record 137.

It should be appreciated that the header information for each data packet generated by the communication device 105 may be largely the same between traffic transmitted from the original IP address and traffic transmitted from the new IP address. In particular, the call ID, the session ID, identifiers of communication device 105 (e.g., a Mobile Identification Number (MIN), a Mobile Directory Number (MDN), a pseudo-Electronic Serial Number (pESN), a Mobile Equipment Identified (MEID), an Integrated Circuit Card Identification (ICC ID), an International Mobile Subscriber Identity (IMSI), or an International Mobile Station Equipment Identity (IMEI), an account name, etc.) may remain constant. Accordingly, rather than comparing a port number, the SBC-localized handoff routine 117 may additionally or alternatively compare a call ID, a session ID, the identifier of the communication device 105, and/or another suitable constant parameter.

It should be further appreciated that the update to the IP address stored in the SBC call record 137 may not be propagated to call records at the packet-switched network 125 and/or maintained by the terminating party. Accordingly, the packet-switched network 125 and the terminating party both still may perform their respective functionality under the assumption that the communication device 105 is accessible at the originally stored IP address. Thus, after the IP address of the communication device 105 changes to a new IP address, the SBC 115 may be the sole or only network entity within the system 100 that determines that traffic directed to the communication device 105 should be received at the new IP address.

As shown in the embodiment depicted in FIG. 1, the system 100 may include the packet-switched network 125. The packet-switched network 125 may facilitate routing (e.g., long-distance routing, inter-carrier routing, etc.) between the plurality of local network 110a-110n and corresponding local networks (e.g., last-mile networks) via which terminating parties may be accessed. The packet-switched network 125 may include, for example, one or more public and/or private IP backbones or networks comprising respective nodes via which data call traffic may be routed. In an embodiment, the packet-switched network 125 may be and/or include the private packet network backbone exchange found in U.S. application Ser. No. 12/469,454, now issued as U.S. Pat. No. 8,284,765. Accordingly, while the system 100 depicts the packet-switched network 125 as a single entity, in some configurations, the packet-switched network 125 may comprise a plurality of different network components to facilitate inter-network routing (as indicated by the dotted line). Furthermore, in some embodiments, the SBC 115 may be considered a component of the packet-switched network 125. To further emphasize the uniquely intelligent nature of the SBC 115, however, any reference herein to a packet-switched network 125 generally refers to all of the components of the packet-switched network 125 except for corresponding intelligent SBCs 115. Thus, when the SBC 115 routes traffic onto the private packet-switched network 125, the SBC 115 may route the traffic to an IP address associated with another component of the packet-switched network 125 configured to receive inbound traffic, such as a server, a proxy, a private branch exchange (PBX), and/or the like.

Figure 2:
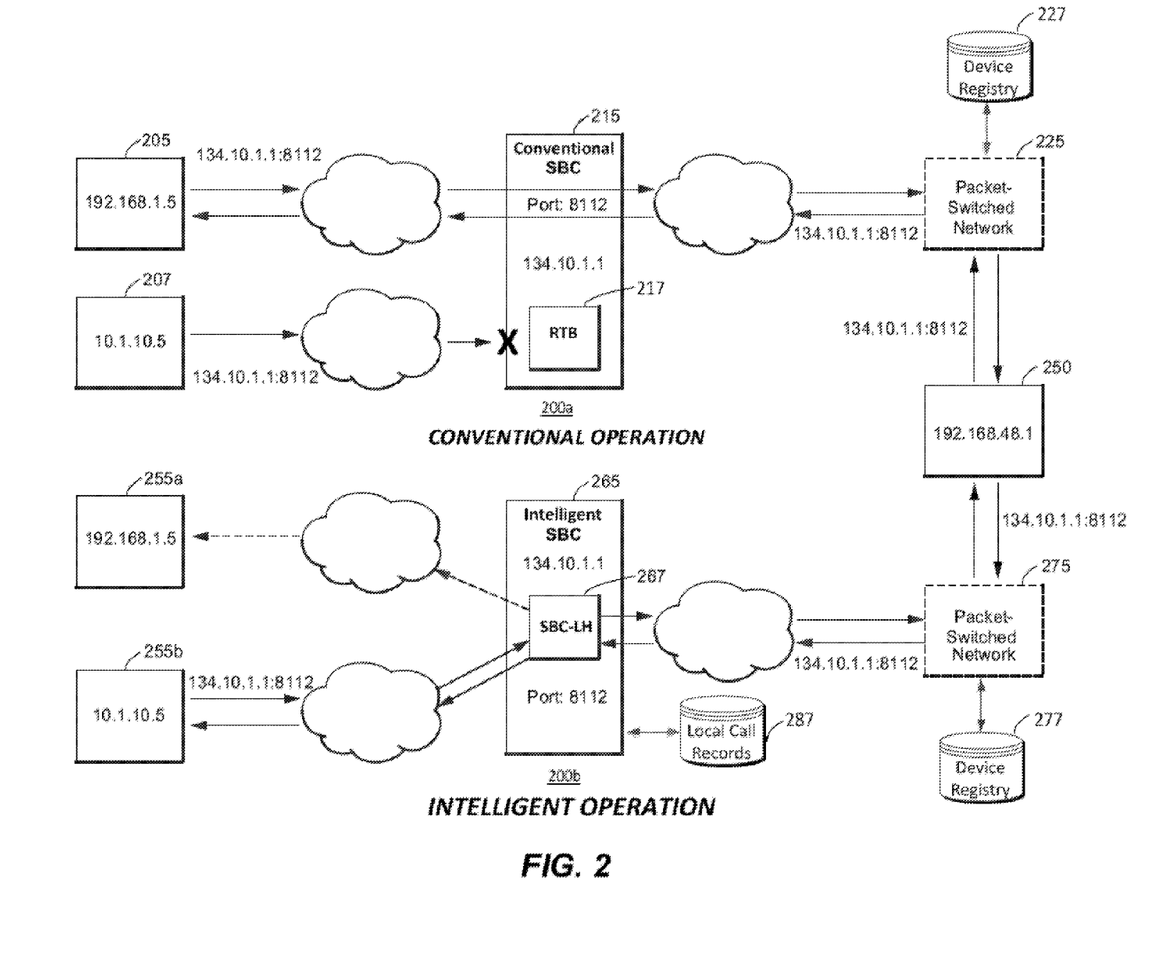
FIG. 2 illustrates a comparison between a conventional SBC and an SBC that is capable of performing an SBC-localized handoff, where the localized-handoff-capable SBC may operate as part of, or in conjunction with, the communication system depicted in FIG. 1.

FIG. 2 illustrates a comparison between a conventional SBC 215 and an intelligent SBC 265 that is capable of performing the aforementioned SBC-localized handoff, e.g., the SBC 115 of the system 100. In particular, FIG. 2 depicts an example scenario in which, within an active communication session, an SBC receives traffic indicating an identifier of the active communication session and indicating a destination IP address that is not currently associated with the active communication session. In both the conventional 200a and intelligent 200b systems, an SBC accessible at address 134.10.1.1 is hosting the communication session via port 8112. It is noted that although FIG. 2 depicts a communication session between only two devices, it is understood that any number of devices may participate in a communication session.

Looking first at the conventional SBC operation 200a illustrated in the upper half of FIG. 2, in this example scenario, a communication device 205 is engaged in an active communication session with a terminating device 250. As depicted, the communication device 205 is accessible at the endpoint IP address 192.168.1.5 and the terminating device 250 is accessible at the endpoint IP address 192.168.48.1. When the communication device 205 originates traffic within the communication session, the originated traffic indicates an intermediate destination address of 134.10.1.1:8112, thus indicating the address of a conventional SBC 215 and the respective port of the SBC 215 on which the communication session is hosted. In addition to the destination address of the conventional SBC 215, header data of the traffic originated by the device 205 may also include a "To" field indicating the other party to the communication session, such as by including an indication of the respective endpoint address of the terminating device 250, e.g., 192.168.48.1. In the reverse direction, when a packet-switched network 225 forwards traffic that is received from the terminating device 250 and that is intended for the communication device 205, the terminating traffic may also indicate the intermediate destination address of 134.10.1.1: 8112, thus referring to the port 8112 of the conventional SBC 215. Further, when the communication device 205 registers with the packet-switched network 225, the packet-switched network 225 may update a device registry and/or database 227 to associate the communication device 205 with its respective endpoint IP address. Similarly, when the terminating device 250 registers with the packet-switched network 225, the packet-switched network 225 may update the device registry and/or database 227 to associate the terminating device 250 with its respective endpoint IP address.

Due to the pass-through nature of the conventional SBC 215, when the conventional SBC 215 receives traffic from the packet-switched network 225, the conventional SBC 215 merely forwards the traffic to whatever IP address is indicated in the header of the traffic packets. Further, when the packet-switched network 225 receives traffic from the terminating device 250, said traffic may only include the intermediate IP address, e.g., 134.10.1.1: 8112, but may not indicate an endpoint IP address of the communication device 205. As such, upon reception of the traffic from the terminating device 250, the packet-switched network 225 may query the device database and/or registry 227 that stores the information relating to all devices registered on the packet-switched network 225, including the devices' respective endpoint IP addresses (as described above). Accordingly, since the registry 227 indicates that the communication device 205 is accessible at endpoint IP address 192.168.1.5, the packet-switched network 225 may add an indication of this information to the traffic packet(s) received from the communication device 250, for example, by including the endpoint IP address 192.168.1.5 of the communication device 205 in the "To" field of the header. Thus, when the conventional SBC 215 receives the traffic from the packet-switched network 225, the conventional SBC 215 simply passes along the received traffic based on the combined (e.g., added, appended, etc.) IP address indicated therein or therewith, e.g. by routing the received traffic using the intermediate IP address provided by the packet-switched network 225 and the endpoint IP address via which the communication device 205 is accessible.

Additionally, as part of its gatekeeper role, the conventional SBC 215 may include a rogue traffic blocker 217. Generally, the rogue traffic blocker 217 prevents traffic from traversing the packet-switched network 225 unless the traffic is received from an IP address and at a port that are currently associated with an active communication session, as far as is known to the conventional SBC 215. Accordingly, if a rogue communication device 207 attempts to transmit traffic via port 8112 of the conventional SBC 215, the conventional SBC 215 may determine, for example, that the origination IP address of the traffic from the rogue communication device 207 (e.g., 10.1.10.5) does not match the IP address associated with the communication session hosted on port 8112 of the conventional SBC 215 (e.g., 192.168.1.5). Consequently, the conventional SBC 215 may actively or passively block the rogue traffic (as indicated by the "X").

It should be appreciated that the conventional SBC 215 does, in fact, enable the communication device 205 to transmit traffic to the terminating party 250 from another IP address as part of the active communication session, e.g., when the communication device 205 hands-off to a different last-mile network 110x. However, as previously described, the conventional approach 200a requires that the communication device 205 to first perform scanning and/or to transmit or receive a handoff request message, thereby initiating the hand-off process. In response to the handoff request message, the communication device 205 transitions to the new network 110x in a manner such that the device registry 227 of the packet-switched network 225 and any similar call records at the conventional SBC 215 (not depicted) are updated to indicate that the communication device 205 is now accessible at the new IP address of the network 110x.

Turning now to the example scenario illustrating an embodiment of intelligent SBC operation 200b as shown in the lower half of FIG. 2, a communication device 255 may be engaged in an active communication session with the terminating device 250. At the commencement of the communication session, the communication device 255 may be accessible via an initial endpoint IP address 192.168.1.5 (as indicated by communication device 255a), and the terminating party may be accessible via the endpoint IP address 192.168.48.1. Similar to the conventional operation scenario 200a, when the communication device 255a originates traffic within the communication session, the originated traffic may indicate a destination address of 134.10.1.1: 8112, thus referring to the address of an intelligent SBC 265 and the port of the SBC 265 on which the communication session is hosted. Again, when a packet-switched network 275 forwards traffic that is received from the terminating device 250 and that is intended for the communication device 255a, the received traffic may indicate, inter alia, an intermediate destination address of 134.10.1.1:8112, thus also indicating the intelligent SBC 265 and the respective port thereon that is utilized for the communication session. However, unlike in the conventional SBC 215 scenario 200a, to determine the endpoint IP address of the communication device 255a in the intelligent scenario 200b, the intelligent SBC 265 may access a call record in a call record database 287 that is local to the SBC 265. The local call record database 287 may actively and intelligently track and maintain the endpoint IP address at which the communication device 255a is currently accessible (e.g., 192.168.1.5). For example, a respective local call record may be created in the local call record database 267 for each communication session hosted by the intelligent SBC 265, and each local call record may store information corresponding to the respective communication session e.g., the current endpoint address of the communication device 255a, a port number corresponding to the communication session, a call ID, a session ID, and/or other similar parameters. In some embodiments, at least some of the local call record 287 may be implemented at the intelligent SBC 265, and in some embodiments, at least some of the local call record database 287 may be implemented at another entity but nonetheless be accessible to the SBC 265.

In the depicted intelligent operation scenario 200b, at some time after the communication session has been initially established, the communication device 255a may then relocate to, and/or become accessible over, a different last-mile wireless network 110x in which the communication device 255 is assigned the new endpoint IP address 10.1.10.5 (as indicated in FIG. 2 by the communication device 255b). Unlike in the conventional operation scenario 200a, though, no handoff messaging is exchanged by the communication device 255 and the intelligent SBC 265 and/or the packet-switched network 275 while the communication device 255 is transitioning networks. Accordingly, despite the communication device 255b being newly addressable at 10.1.10.5, a device registry 277 at the packet-switched network 275 may still indicate that the communication device 255b is accessible at the initial endpoint IP address 192.168.1.5. Thus, if this situation occurred in the conventional operation scenario 200a, when the communication device 255b begins transmitting traffic to the conventional SBC 215 at the port 8112 and indicating the endpoint IP address 10.1.10.5, the rogue traffic blocker 217 of the conventional SBC 215 would block the traffic (similar to how the conventional SBC 215 blocked traffic from the rogue communication device 207).

On the other hand, in the intelligent operation scenario 200b, upon receiving the traffic from the communication device 255b that includes the updated endpoint IP address of 10.1.10.5, the SBC 265 may execute an SBC-localized handoff routine 267 which maintains communication session connectivity without updating or otherwise involving and/or notifying the packet-switched network 275. In an embodiment, the SBC-localized handoff routine 267 may be included in the SBC-Localized handoff routine 117 of FIG. 1, or vice versa. At any rate, upon receiving a data packet from the communication device 255b indicating the endpoint IP address 10.1.10.5, the localized handoff routine 267 may update the local SBC call record database 287 to indicate that the communication device 255b is now accessible at the endpoint IP address 10.1.10.5. It should be appreciated that in some embodiments, the SBC-localized handoff routine 267 may verify the identity of the communication device 255 prior to updating the local SBC call record with the new endpoint IP address (e.g., by comparing an identifier of the communication device 255b to one stored in the local SBC call record database 287). It is also appreciated that, in some embodiments, the endpoint IP address of the communication device 205 is the only information associated with the active communication session that is updated in the local SBC call record database 287 when a different endpoint IP address is indicated by the communication device 255. Further, in some cases, the SBC 265 may not notify any other network element (e.g. may not notify the packet-switched network 275 and/or the terminating communication device 250) of the change in the endpoint IP address of the communication device 255b.

After the local SBC call record database 287 is updated with the current endpoint IP address via which the communication device 255b is now accessible, the SBC 265 may receive further traffic from the packet-switched network 275 as part of the active communication session. Since the device registry 277 at the packet-switched network 275 has not been updated to indicate the updated endpoint IP address of the communication device 255b, the traffic delivered from the packet-switched network 275 to the intelligent SBC 265 may still indicate that the endpoint destination address of the communication device 255 is the initial endpoint IP address of 192.168.1.5 (as indicated in FIG. 2 by the dotted line). However, rather than simply passing-through or routing the traffic to the endpoint IP address indicated by the packet-switched network 275, the SBC 265 may instead intelligently query the local SBC call record database 287 to determine the appropriate endpoint destination address of the communication device 255b. As a result, the SBC 265 may route the traffic to the updated endpoint IP address of the communication device 255b as indicated by the local SBC call record database 287. Thus, unlike in the conventional operation scenario 200a, in the intelligent operation scenario 200b, the endpoint IP address of the communication device 205 to which the traffic is actually routed by the SBC 265 may be different and/or more current than the endpoint IP address of the communication device 205 indicated by the packet-switched network 275.

It is noted that as the update of the endpoint IP address of the communication device 255b at the local SBC call record database 287 may only impact the SBC 265, the communication device 255 may not be able to interact with other communication devices via the packet-switched network 275. In particular, after the SBC-localized handoff, the device registry 277 at the packet-switched network 275 may incorrectly indicate that the communication device 255 is still located at the initial endpoint IP address 192.168.1.5.

Thus, if another communication device requests to establish a data call with the communication device 255 via the packet-switched network 275, the request would be routed to 192.168.1.5. Since the communication device 255 is no longer accessible at 192.168.1.5, this call request will fail. As will be explained in more detail below, this scenario can be mitigated and/or overcome such that the benefit of improved performance for the communication device 255 outweighs any momentary inconvenience caused by this scenario.

Figure 3:
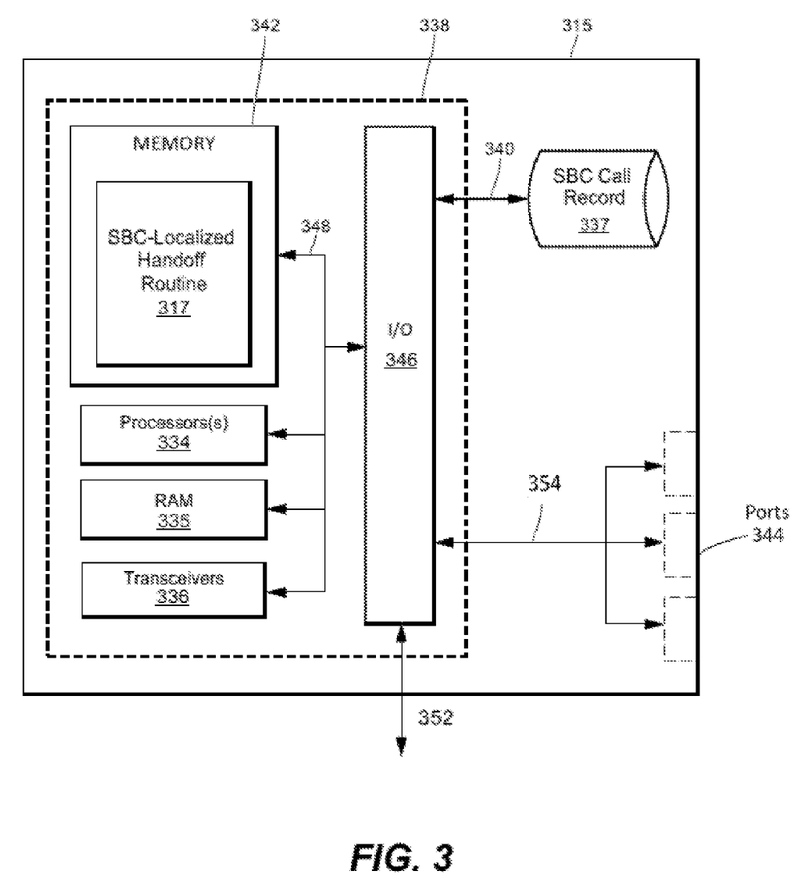
FIG. 3 is a block diagram of an example computing device implementing an SBC-localized handoff capability, such as the SBC depicted in FIG. 1 and/or the localized-handoff-capable SBC of FIG. 2.

FIG. 3 illustrates an example intelligent SBC 315 that may be specifically configured to perform one or more embodiments of the SBC-localized handoff functionality as described herein. The SBC 315 may be implemented as the SBC 115 in the system 100 of FIG. 1 or the SBC 265 of FIG. 2, for example.

The SBC 315 may include one or more computer processors 334 specially adapted and configured to execute various modules, engines, applications and/or components of the SBC 315, in addition to other applications. The SBC 315 may further include a local SBC call record database 337, such as the local call record databases 137 and/or 237. The SBC call record database 337 may be adapted to store data related a plurality of data calls traversing the SBC 315. In particular, the SBC call record database 337 may include a separate record for each of the plurality of data calls. Such a record may include a port number of the SBC 315 that has been assigned to the data call, a call ID, a session ID, a respective IP address at which each party or communication device of the data call is accessible, a respective IP address at which each intermediate and last-mile network entity that routes data between the call parties is accessible, a respective identifier corresponding to each party of the data call, and/or other similar type of data related to the data call. The SBC 315 may access data stored in the SBC call record database 337 when executing various functions and tasks associated with the operation of the SBC 315. It is noted that although in FIG. 3, the SBC call record database 337 is shown as being included in the intelligent SBC 315, this is only one of many embodiments. For example, in another embodiment, at least a portion of the SBC call record database 337 may be included in another entity other than the SBC 315, but nonetheless may be accessible to the intelligent SBC 315.

Further, although illustrated the SBC 315 is illustrated in FIG. 3 as a single entity, the specialized functionality implemented by the SBC 315 may be distributed among a plurality of servers and/or computing devices, in an implementation. A distributed configuration may provide several advantages, such as, for example, providing additional capacity (e.g., additional ports) to route additional calls through the SBC 315.

The SBC 315 may have a controller 338 that may be operatively connected to the SBC call record database 337 via a link 340. It should be noted that, while not shown, additional databases may be linked to the controller 338 in a known manner, such as, for example, a database storing information related to devices registered on a packet-switched network, such as the device registry 277 of FIG. 2. The controller 338 may include a non-transitory program memory 342, the one or more processors 334 (may be called a microcontroller or a microprocessor), a random-access memory (RAM) 335, a plurality of transceivers 336, and an input/output (I/O) circuit 346, all of which may be interconnected via an address/data bus 348. Additionally, the I/O circuit 346 may be interconnected with a plurality of ports 344 via a link 354. The plurality of ports 344 may communicatively and/or logically connect the SBC 315 and/or interface with one or more packet-switched networks (e.g., networks 125, 225, 275) and with one or more local networks (e.g., networks 110a-110n). The program memory 342 may be configured to store computer-readable or computer executable instructions that specially configure the SBC 315 such that, when executed by the processors 334, the computer-readable instructions cause the SBC 315 to implement and/or execute the SBC-localized handoff routine 317.

In particular, the instructions for the SBC-localized handoff routine 317 may cause the SBC 315 to, at least partially, implement the functionality associated with localized handoff routines described elsewhere herein, e.g., the handoff routine 117 and/or the hand-off routine 267. While shown as a single block in FIG. 3, it will be appreciated that the SBC-localized handoff routine 317 may include any number of different programs, modules, routines, and sub-routines that may collectively cause the SBC 315 to implement the localized handoff routine. Further, while the instructions for the SBC-localized handoff routine 317 are shown in FIG. 3 as being stored in the program memory 342, the instructions may additionally or alternatively be stored in the RAM 335 and/or in another memory of the SBC 315. Additionally, although the I/O circuit 346 is shown as a single block, it should be appreciated that the I/O circuit 346 may include any number of different types of I/O circuits. As an example, the I/O circuit 346 may enable an operator to update programs stored in the memory 342 via the link 352. The RAM 335 and program memories 342 may include one or more non-transitory, tangible memories implemented as semiconductor memories, magnetically readable memories, and/or optically readable memories, for example.

The plurality of transceivers 336 may be specially configured for interoperability with a plurality of different network types. For example, some of the plurality of transceivers 336 may be tuned to 2.4 GHz for interoperability with some Wi-Fi networks, while others of the plurality of transceivers 336 may be tuned to 1900 MHz for interoperability with some mobile carrier LTE networks. The plurality of transceivers 336 may be configured to exchange packet data with a communication device (e.g., the device 105 or the device 205) using a frequency at which at least some of the plurality of transceivers 336 are tuned. Packet data received by the plurality of transceivers 336 may be analyzed by the SBC-localized handoff routine 317 and/or other programs and/or routines prior to routing the packet data onto a packet-switched network, such as a private packet network backbone. Prior to transmitting packet data, the controller 348 may query the SBC call record database 337 to determine an IP address to transmit the packet data and a frequency associated with the wireless network to which the IP address corresponds. The specific transceiver of the plurality of transceivers 336 used to actually transmit the packet data may vary based on this determined frequency.

Although the plurality of ports 344 are depicted in FIG. 3 as physical entities, in some embodiments the plurality of ports may 344 may represent logical entities. For example, the SBC 315 may be capable of hosting a plurality of data calls simultaneously. To be able to identify a specific data call, the SBC 315 may assign each data call a logical port and/or port number, which may then map to a respective physical interface. Accordingly, each port of the plurality of ports 344 may refer to a logical connection between devices communicating within each data call hosted by the SBC 315.

Additionally, the SBC 315 may utilize one or more wireless and/or wired connections to exchange packet data with one or more packet-switched networks, e.g., the networks 125, 225, and/or 275. For example, the SBC 315 and a packet-switched network may be interconnected via a wired Ethernet connection. Accordingly, the I/O components 346 may include an Ethernet port accessible via link 352. Additionally, the SBC 315 and a packet-switched network may be interconnected via a wireless link. Accordingly, the plurality of transceivers 336 may be additionally configured to exchange data at a frequency and/or using a convention that is supported by the packet-switched network.

Figure 4:
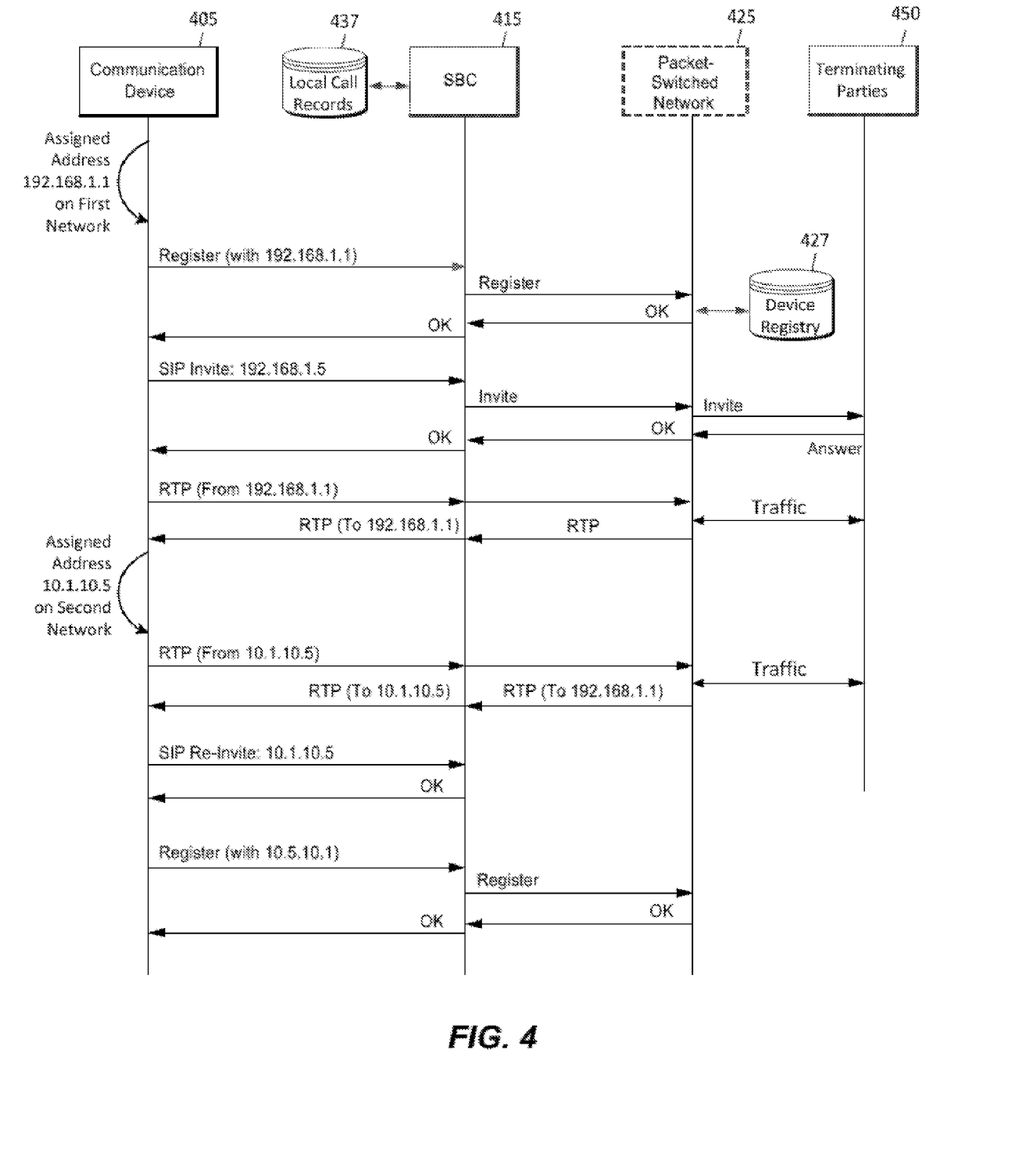
FIG. 4 is an example call flow in which a SBC, such as the SBC depicted in FIG. 1 and/or the localized-handoff-capable SBC of FIG. 2, performs an SBC-localized handoff.

Turning to FIG. 4, FIG. 4 illustrates an example call flow 400 in which a SBC 415, such as the SBC 115 of the system 100, performs an SBC-localized handoff. The functionalities described with reference to the call flow 400 may be implemented, for example, by the system 100, in the scenario 200*b*, and/or at least partially by the SBC 315. Although Session Initiation Protocol (SIP) and Real-time Transport Protocol (RTP) are emphasized with reference to FIG. 4, it is understood that any suitable protocol may be used to register with a communication network, establish a communication session, and/or transmit data within a communication session.

The call flow 400 may begin when the communication device 405 registers on a first wireless network (not shown). As part of the registration process, the first wireless network may assign the communication device an IP address of 192.168.1.1. Once the communication device 405 is registered on the first wireless network, the communication device 405 may automatically, or in response to a user input (e.g., by launching a communication client such as the client 107 shown in FIG. 1), attempt to register with a communication network, which is illustrated in FIG. 4 as the packet switched network 425. The packet-switched network 425 may facilitate communication sessions (e.g., VoIP calls, video conferencing calls, etc.) between devices registered on the packet-switched network 425. In order to register on the packet-switched network 425, the communication device 405 may transmit a registration command to an SBC 415 associated with the packet-switched network 425. The registration command may be a SIP register command indicating the IP address of the communication device (e.g., 192.168.1.1) and a SIP Call ID generated by the communication device 405, in an example.

Upon receiving the registration request, the SBC 415 may analyze the request to determine whether the communication device 405 is authorized to use the packet-switched network 425. The SBC 415 may perform any technique known in the art to make this determination. As an example, the SBC 415 may challenge the registration request, thereby requiring the communication device 405 to reply with a passkey. Once the SBC 415 determines that the communication device 405 is allowed access onto the packet-switched network 425, the SBC 415 may forward the registration request to the packet-switched network 425 to complete the registration process.

Although FIG. 4 depicts the packet-switched network 425 as a single entity, the packet-switched network 425 may comprise many different networking components to perform the various functionalities described herein. As an example, the packet-switched network 425 may utilize a proxy server, an IP-PBX, and/or various other networking components to actually communicate with the SBC 415. Accordingly, for ease of explanation, the call flow 400 refers to the packet-switched network 425 as performing the functionality as opposed to any individual networking component associated therewith.

In response to receiving the registration request from the SBC 415, the packet-switched network 425 may update a device registry 427 therein to indicate that the communication device 405 is registered on the packet-switched network 425. For example, the device registry may be the device registry 227 or 277 shown in FIG. 2. The device registry may indicate the communication device 405 is available via the IP address included in the registration request (e.g., 192.168.1.1), as well as, inter alia, any other identifying information related to the communication device 405. Once the packet switched network 425 successfully updates the device registry 427, the packet-switched network 425 may transmit a SIP 200 (OK) message to the SBC 415 to indicate that the registration of the communication device 405 occurred successfully. The SBC 415 may then route the SIP 200 (OK) message to the communication device 405. At this point, the registration with the packet-switched network 425 is complete.

The communication device 405 may now automatically, or in response to user input, utilize a communication client (e.g., the communications client 107 shown in FIG. 1) to attempt to establish a communication session with one or more other parties registered on the packet-switched network 425 (the terminating parties 450). Once the user has selected the terminating parties 450, the communication device 405 may transmit an invite message that is to eventually be received by each of the selected terminating parties 450. In particular, the invite message may take the form of an SIP invite message, wherein the SIP invite message includes an indication of the call ID, a session ID generated by the communication device 405, an endpoint IP address of the communication device 405, and/or an address for each of the terminating parties 450. The communication device 405 may transmit the invite message to the SBC 415, which may in turn forward the invite message onto the packet-switched network 425. Additionally, the SBC 415 may assign the communication session a port number associated with an available port on the SBC 415 (the "bearer path port").

In response to receiving the invite message, the packet-switched network 425 may utilize the device registry 427 to determine a respective IP address corresponding to each of the terminating parties 450. Accordingly, the packet-switched network 425 may route the invite message to the each determined IP addresses corresponding to the respective terminating parties 450. After some time, the packet-switched network 425 may receive a response and/or an answer from at least one of the terminating parties 450 indicating that the respective terminating party has answered the call. In response, the packet-switched network 425 may transmit a SIP 200 (OK) message to the SBC 415 to indicate that the communication session was answered by the respective terminating party. The SBC 415 may then route the SIP 200 (OK) message to the communication device 405.

Additionally, the SBC 415 may generate and/or update a local SBC call record 437 corresponding to the communication session. The SBC call record 437 may include an indication of the call ID, the session ID, the port number assigned to the communication session, and a respective endpoint IP address identifying a respective address at which each of the communication device 405 and the terminating parties 450 are accessible. In some embodiments, the SBC 415 may create and/or populate the SBC call record 437 by copying information stored in the device registry 427 at the packet-switched network 425. Additionally, in some embodiments the SBC call record 437 may be populated based on information obtained from the header data of the invite message.

At this point, the communication session with the responding terminating party of the terminating parties 450 has been successfully established. For simplicity's sake, in the discussion below, the call flow 400 assumes that all of the terminating parties 450 successfully joined the communication session. According to some embodiments, the communication session may require that communication devices transmit traffic using a signaling protocol, such as RTP, that is optimized for VoIP and/or video conferencing calls. Accordingly, the communication device 405 may now generate and transmit RTP traffic to the SBC 415. In response to receiving RTP traffic from the communication device 405, the SBC 415 may compare an origination IP address indicated by the RTP traffic to the endpoint IP address of the communication device 405 that is stored in the SBC call record 437 corresponding to the communication session. If these IP address match, the SBC 415 may route, via the assigned bearer path port, the RTP traffic onto the packet-switched network 425 to be terminated at each of the terminating parties 450.

Similarly, when one of the terminating parties 450 transmits RTP traffic via the packet-switched network 425, the packet-switched network 425 may then forward the RTP traffic to the SBC 415. The SBC 415 may then query the SBC call record 437 to determine a respective endpoint IP address of the communication device 405 to which the RTP traffic is to be routed. In particular, the SBC 415 may utilize a port number or other identifier to query the SBC call record 437. The SBC 415 may then route, via the assigned bearer path port, the RTP traffic to the communication device 405 utilizing the first wireless network.

At some point after the communication session has been established, the communication device 405 may move onto a second wireless network (not shown). Consequently, the communication device 405 may be assigned an endpoint IP address on the second wireless network via which the communication device 405 is accessible. Moreover, it should be appreciated that prior to moving onto the second wireless network, the communication device 405 and the SBC 415 exchanged no handoff signaling messages (as indicated by their absence in the call flow 400).

In some embodiments, the communication device 405 may have previously been registered on the second wireless network. In these embodiments, rather than registering on a second wireless network, the communication device 405 may utilize the second wireless network as a preferred network for the communication session. For example, many mobile phones support simultaneous registration on both Wi-Fi and LTE. However, due to network congestion concerns, many mobile carriers require that their mobile phones prefer Wi-Fi over LTE networks. Accordingly, although the mobile device is still registered on the LTE to, for example, receive Voice over LTE (VoLTE) calls, most non-VoLTE data calls may be routed over the Wi-Fi network. Thus, if the user of the mobile phone disables Wi-Fi, the mobile phone may prefer the LTE network that was previously reserved for only VoLTE calls. It should be understood that this change in the preferred wireless network is functionally equivalent to the communication device 405 moving onto a second wireless network, as it relates to the call flow 400.

At any rate, when the communication device 405 is connected to the second wireless network, the communication device 405 may begin generating and transmitting RTP traffic within the communication session over the second wireless network. The RTP traffic may include an indication of the assigned port number, the call ID, and/or the session ID associated with the communication session. When the SBC 415 receives the first data packet of the newly generated RTP traffic, the SBC 415 may again query the SBC call record 437 corresponding to the communication session. Unlike the query when the communication device 405 was registered on the first wireless network, the origination address indicated by the first data packet (e.g., 10.1.10.5) does not match the IP address of the communication device stored in the SBC call record 437 (e.g., 192.168.1.1). In response, the SBC 415 may update the SBC call record 437 to indicate that the communication device 405 is now located at the origination address indicated by the data packet (e.g., 10.1.10.5). In some embodiments, the SBC 415 may verify the identity of the communication device 405 prior to updating the SBC call record 437. Once the SBC call record 437 is updated, the SBC 415 may route, via the bearer path port, the data packet onto the packet-switched network 425.

It should be understood that the changes to the SBC call record 437 may not propagated to similar call and/or device records maintained at the packet-switched network 425 (e.g., the device registry 427), at any intermediate networks, and/or by the terminating parties. Accordingly, when one of the terminating parties transmits RTP traffic onto the packet-switched network 425, the device registry 427 at the packet-switched network 425 indicates that the communication device 405 is accessible at the endpoint address corresponding to the first wireless network (e.g., 192.168.1.1). Thus, when the packet-switched network 425 routes the RTP traffic to the SBC 415, the RTP traffic may include an indication to deliver the RTP traffic to the endpoint IP address 192.168.1.1.

When the SBC 415 receives the RTP traffic that includes the indication for delivery to the original endpoint IP address 192.168.1.1, the SBC 415 may query the SBC call record 437 to independently determine the appropriate, current endpoint address to use for routing the RTP traffic to the communication device 405. In this call flow 400, since the SBC call record 437 may indicate that the communication device 405 is accessible at 10.1.10.5, the SBC 415 may route, via the assigned bearer path port, the RTP traffic to 10.1.10.5. Consequently, the endpoint IP address indicated by the packet-switched network 425 may be ignored and/or overridden by the SBC 415.

It should be appreciated that, due to the localized nature of updating only the SBC call record 437, that the communication device 405 may not be properly registered with the communication session and/or the packet-switched network 425. For example, some advanced features of the communication session require a terminating party to know the endpoint IP address of the target communication device 405, e.g., hold, transfer, presence, and/or the ability to add or drop individual parties. Since the communication session has not been updated to reflect the new address of the communication device 405, these advanced features may not function properly. In another example, the device registry at the packet-switched network 425 still indicates that the communication device 405 is located at 192.168.1.1. As a result, the packet-switched network 425 may route requests to establish new calls with the communication device 405 to 192.168.1.1. This request may be assigned a call ID separate from the communication session described with respect to the call flow 400. Therefore, when the SBC 415 receives the request from the packet-switched network 425, there may be no SBC call record 437 to query. As a result, the SBC 415 may route the request to 192.168.1.1 where it may not receive a reply.

To remedy these situations, at some point after the performance of the SBC-localized handoff, the communication device 405 may transmit to the SBC 415 a SIP re-invite message. The SIP re-invite message may include an indication of the current endpoint address at which the communication device 405 is accessible. Accordingly, when the SBC 415 receives the SIP re-invite message, the SBC 415 may update the communication session to indicate that the communication device 405 is now located at 10.1.10.5. By updating the communication session itself, the SBC 415 enables the aforementioned advanced features associated with the communication session. After the SBC 415 successfully updates the communication session in response to the SIP re-invite message, the SBC 415 may transmit a SIP 200 (OK) message to the communication device 405.

However, updating the communication session records does not update the device registry 427 at the packet-switched network 425. Consequently, the communication device 405 still cannot receive new calls via the packet-switched network 425. Accordingly, at some point after the performance of the SBC-localized handoff, the communication device may transmit to the SBC 415 a SIP registration message with the updated IP address associated with the second wireless network (e.g., 10.1.10.5). The SBC 415 may then forward the SIP registration message to the packet-switched network 425. In response, the packet-switched network 425 may update the device registry 427 to indicate that the communication device 405 is now located at 10.1.10.5. After the device registry 427 is successfully updated, the packet-switched network 425 may then transmit a SIP 200 (OK) message to the SBC 415, which in turn routes the SIP 200 (OK) message to the communication device 405. After the update to both the communication session and the device registry 427, the communication device 405 returns to a normal operating state.

In some embodiments, the transmission of the SIP re-invite message and the second registration message may be controlled and/or regulated by the communication client executing on the communication device 405. For example, the communication client may be configured to transmit the SIP re-invite message 500 ms after communication device 405 begins transmitting data on the second local network. Similarly, the communication client may be configured to transmit the second registration message one second after communication device 405 begins transmitting data on the second local network. In some embodiments, the communication client may be configured by a developer of the communication client and/or a user of the communication device 405. It should be understood that in some embodiments, the transmission of the second registration message may occur prior to the transmission of the SIP re-invite message. It should be understood that the communication client may be configured to minimize and/or mitigate the aforementioned drawbacks of the SBC-localized handoff solution by causing the communication device 405 to transmit the SIP re-invite message and/or the second registration message shortly after the communication device moves onto the second wireless network.

In a sense, the SBC-localized handoff solution may be considered to allow momentarily degraded functionality to free up processor and/or memory resources at the communication device 405. According to certain aspects, it may be important to minimize the usage of processor resources at the communication device 405. For example, the operator of the packet-switched network 425 and/or the SBC 415 may sell the communication client and/or may be co-branded with the manufacturer of the communication device 405. Thus, if the communication device 405 has poor battery life or is unable to efficiently multitask while engaged in a communication session, the user of the communication device 405 may have a negative opinion of the operator. Since there is only a very small chance that the communication device 405 may actually receive another call prior to the restoration of full functionality, the benefits to the user experience on the communication device 405 may outweigh any drawback associated with the brief degradation in functionality.

Similarly, the SBC-localized handoff solution may increase network efficiency for the local networks 110*x*. In particular, the SBC-localized handoff solution may require the transmission of fewer signaling messages than the conventional handoff solution. As a result, the local networks 110*x* may be less congested. Moreover, since the SBC-localized handoff solution may reduce the signaling messaging required to perform a handoff, the communication device 405 may begin transmitting RTP data on the second network more quickly than conventionally possible.

Figure 5:
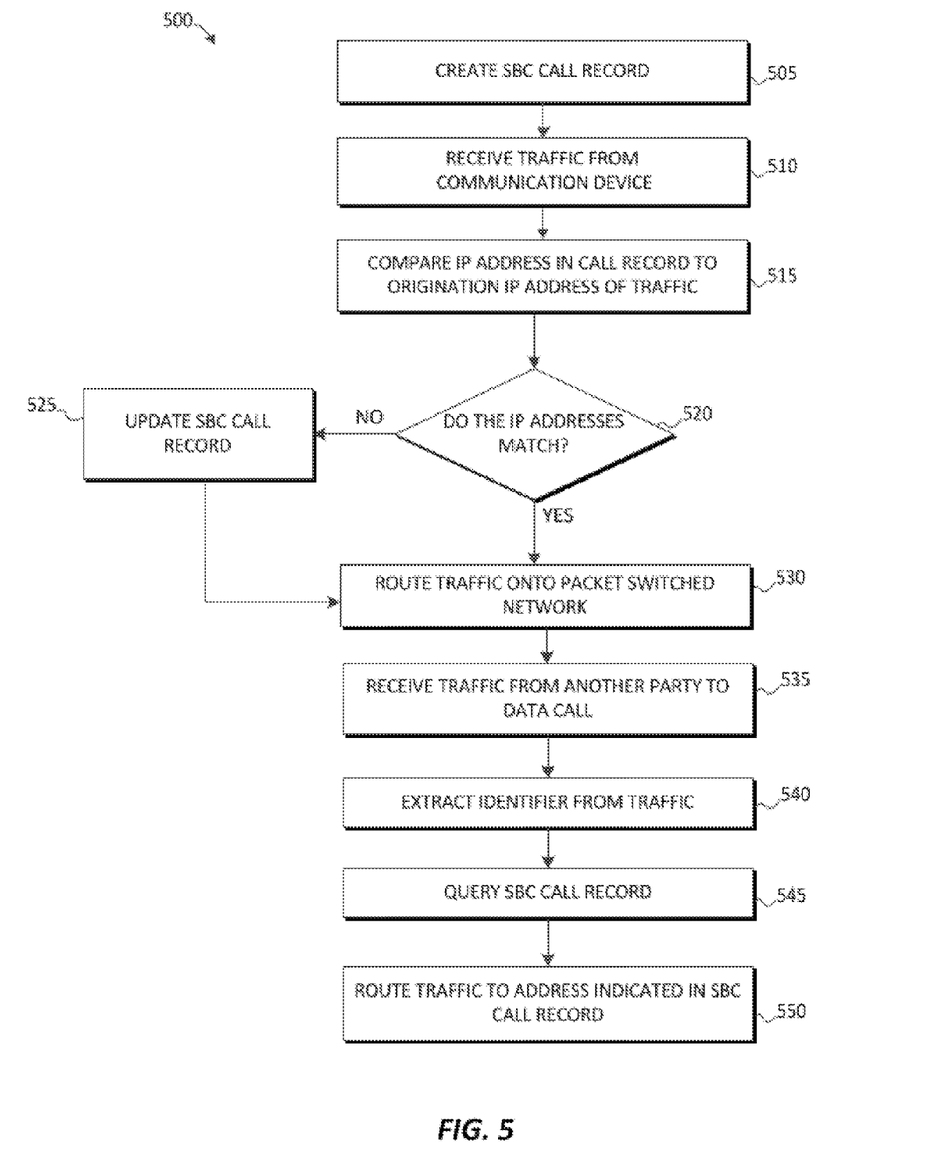
FIG. 5 is an example flow diagram of an example method for performing an SBC-localized handoff, which may be implemented in the communication system depicted in FIG. 1.

Turning now to FIG. 5, FIG. 5 illustrates a flow diagram of an example method 500 for performing a localized handoff at an intelligent SBC. The SBC performing the method 500 may be any of the intelligent SBCs 115, 215, 315, or 415 as described above. For example, computer-executable instructions stored in the memory 342 of the communication device 315 illustrated in FIG. 3 may be executed to perform at least a portion of the method 500.

To begin, as part of the call establishment process for a data call, the SBC may create (Block 505) a locally accessible SBC call record. The SBC call record may include information identifying each of the parties involved in the data call, as well as information identifying the data call itself. Further, the SBC call record may be populated based on information indicated by a communication device while attempting to establish the data call and/or based on information stored at a packet-switched network (such as the packet-switched network 125 of the system 100 or the packet-switched network 275 of FIG. 2). As a result, the SBC may maintain a locally accessible database of local SBC call records for all active data calls currently routed through the SBC.

Accordingly, the SBC may monitor all inbound traffic transmitted by communication devices engaged in an active data call. Upon receiving (Block 510) the inbound traffic from a particular communication device, the SBC may extract an identifier (e.g., a port number, a call ID, a session ID, etc.) to use in querying the corresponding SBC call record in the SBC call record database. The SBC may then compare (Block 515) an origination endpoint IP address of the particular communication device indicated by the received traffic to an endpoint IP address of the particular communication device indicated by the queried SBC call record. The SBC may then determine (Block 520) whether these IP addresses match one another. If the IP addresses match ("YES" leg of Block 520), then the SBC may route (Block 530) the traffic onto the packet-switched network.

Conversely, the SBC may receive traffic from a communication device where the origination endpoint IP address of the communication device indicated by the traffic is different from the endpoint IP address of the communication device indicated in the queried SBC call record ("NO" leg of Block 520). In some embodiments, the SBC may compare a device identification parameter indicated in the traffic (e.g., a MIN, a pESN, a MEID, an account name, etc.) to a similar parameter stored in the queried SBC call record to verify that the traffic is received from the appropriate communication device. Subsequently, the SBC may update (Block 525) the queried SBC call record to indicate that the communication device is now located at the IP address indicated by the origination IP address of the traffic. Subsequently, or in parallel with the block 525, the SBC may then route (Block 530) the traffic onto the packet-switched network.

At some point in time after updating the queried SBC call record, the SBC may receive (Block 535) traffic from the packet-switched network as part of the same data call. In particular, the traffic may be originated by a party of the data call other than the communication device accessible at the updated IP address in the SBC call record. As previously described, this traffic may indicate the traffic should be delivered to the original endpoint IP address via which the communication device is no longer accessible. Accordingly, when the SBC receives the traffic via the packet-switched network, may extract (Block 540) and/or obtain an identifier from the received traffic to identify the appropriate record in the SBC call record database. The SBC may use the extracted identifier to query (Block 545) the SBC call record database. Since the SBC previously updated the queried SBC call record, the SBC may then route (Block 550) the traffic to the updated endpoint IP address indicated by the queried SBC call record and not the IP address indicated by the received traffic.

As it is generally used herein, the word "route" in reference to a data packet, packet data, and/or traffic refers the act of causing the payload of a data packet to be received by at a destination entity and/or address. As it is used herein, the term "payload" refers to the content of a communication session and/or the data within a data packet exclusive of any header data. It should be appreciated that some networks include compression and/or traffic shaping techniques that alter the payload of packets transmitted thereon. Accordingly, any compressed, decompressed, or otherwise shaped and/or altered version of the payload is still considered "the payload" for purposes of this application.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. Accordingly, it should be understood that the methods and system described herein are illustrative only and are not limiting upon the scope of the claims.

Thus, many modifications and variations may be made in the techniques and structures described and illustrated herein without departing from the spirit and scope of the present claims.

What is claimed:

1. A method comprising:
    associating, at a packet network interface, a first communication device, a particular port of a Session Border Controller (SBC), and a first IP address via which the first communication device is accessible;
    receiving, at the particular port of the packet network interface, a first packet from the first communication device, the first packet including first content that is to be delivered to a second communication device, and the first packet indicating that the first communication device is accessible via a second IP address;
    subsequent to receiving the first packet, receiving, at the SBC from the second communication device, a second packet indicating the first IP address and including second content that is to be delivered to the first communication device; and
    routing, by the packet network interface, the content of the second packet to the first communication device by using the second IP address.

2. The method of claim 1, further comprising:
    the first packet being associated with a communications session, and
    assigning, by the packet network interface, the communications session to the particular port of the packet network interface, and wherein the second packet is routed via the assigned particular port.

3. The method of claim 2, further comprising:
    obtaining, by the packet network interface, an identifier indicated by the second packet data;
    using the identifier, querying, by the packet network interface, a local call record corresponding to the communication session; and
    determining, by the packet network interface, an address at which the local call record indicates that the first communication device is accessible.

4. The method of claim 3, wherein obtaining the identifier corresponding to the communications session comprises obtaining at least one of: an identifier of the particular port, the first IP address, a Session Initiation Protocol (SIP) Call ID, or a session ID that was established with the communication session.

5. The method of claim 1, wherein receiving the second packet comprises receiving the second packet via a private packet network backbone.

6. The method of claim 1, wherein the first IP address corresponds to a first communications network and the second IP address corresponds to a second communications network.

7. The method of claim 1, wherein at least one of the first packet and the second packet is formatted in accordance with a real-time traffic protocol (RTP).

8. A system comprising:
    a plurality of transceivers adapted to send and receive data corresponding to a data call;
    a memory adapted to store non-transitory computer executable instructions; and
    one or more processors adapted to interface with the plurality of transceivers, the one or more processors being configured to execute the non-transitory computer executable instructions to cause the system to:
        create a local call record corresponding to the data call and indicating a first address via which a communication device servicing the data call is accessible;
        while the local call record indicates that the communication device is accessible via the first address, receive, at the plurality of transceivers, first traffic of the data call, the first traffic indicating a second address via which the communication device is accessible;
        in response to the reception of the first traffic indicating the second address, update the local call record to indicate that the communication device is accessible via the second address and not via the first address;
        subsequent to updating the local call record, receive, at the plurality of transceivers, second traffic of the data call, the second traffic indicating the first address of the communication device and including a data payload to be delivered to the communication device; and route the data payload of the second traffic to the communication device using the second address.

9. The system of claim 8, wherein the data call is included in a plurality of data calls routed by the system, and wherein the non-transitory computer executable instructions are further executable by the one or more processors to cause the system to:

create a respective local record for each data call included in the plurality of data calls;

update the respective local record for the each data call with an indication of a current address of a respective communication device servicing the each data call; and route traffic of the each data call using the updated, current address.

10. The system of claim 8, wherein the local call record corresponding to the data call includes an identifier of the data call.

11. The system of claim 10, wherein the identifier of the data call comprises at least one of: an identifier of a port of the system utilized to route packets to and from the communication device during the data call, the first address corresponding to the communication device, a Session Initiation Protocol (SIP) Call ID, or a session ID.

12. The system of claim 11 wherein the second traffic further includes an indication of the identifier of the data call.

13. The system of claim 8, wherein a first communications network assigns the communication device the first address and a second communications network assigns the communication device the second address.

14. The system of claim 8, wherein to update the local call record the non-transitory computer executable instructions are further executable by the one or more processors to cause the system to:

compare a first device identifier indicated by the first traffic to a second device identifier stored in the local call record, wherein the first and second device identifiers comprises at least one of: a Mobile Identification Number (MIN), a Mobile Directory Number (MDN), a pseudo-Electronic Serial Number (pESN), a Mobile Equipment Identified (MEID), an Integrated Circuit Card Identification (ICC ID), an International Mobile Subscriber Identity (IMSI), an International Mobile Station Equipment Identity (IMEI), or an account name; and verify that the first device identifier matches the second device identifier; and in response to the verification, storing the second address in the local call record.

15. A non-transitory computer-readable storage medium storing processor-executable instructions, that when executed cause one or more processors to:

assign, by a Session Border Controller (SBC), a bearer path port of the SBC to a communication session between a first communication device and a second communication device;

route, via the SBC and by using the bearer path port, one or more data packets of the communication session to the first communication device using a first IP address;

receive, at the SBC via the bearer path port, a data packet of the communication session that is to be delivered to the second communication device, the data packet including an indication that the first communication device corresponds to a second IP address; and responsive to receiving the data packet that is to be delivered to the second communication device, route, via the SBC and by using the bearer path port, one or more further data packets of the communication session to the first communication device using the second IP address.

16. The non-transitory computer-readable medium of claim 15, wherein the data packet that is to be delivered to the second communication device is received from the first communication device at a first point in time, and wherein the instructions further cause the one or more processors to receive, at the SBC at a second point in time occurring after the first point in time, an invite message from the first communication device, the invite message comprising an indication of the second IP address.

17. The non-transitory computer-readable medium of claim 16, wherein the instructions further cause the one or more processors to:

upon receiving the invite message, enable, by the SBC, one or more advanced call features associated with the communication session, the one or more advanced call features comprising at least one of: hold or transfer.

18. The non-transitory computer-readable medium of claim 15, wherein the data packet that is to be delivered to the second communication device is received from the first communication device at a first point in time, and wherein the instructions further cause the one or more processors to:

receive, at the SBC at a third point in time occurring after the first point in time, a registration message from the first communication device, the registration message comprising an indication of the second IP address; and upon receiving the registration message from the first communication device, transmit, by the SBC, another registration message to a packet-switched network, the another registration message indicating the second IP address.

19. The non-transitory computer-readable medium of claim 15, wherein:

the first IP address is assigned to the first communication device by a first wireless network; and the second IP address is assigned to the first communication device by a second wireless network.

20. The non-transitory computer-readable medium of claim 15, wherein to route the one or more further data packets to the first communication device using the second IP address the instructions further cause the one or more processors to route one or more further data packets using the second IP address, the one or more further data packets including an indication of the first IP address.

* * * * *